United States Patent Office 3,076,005
Patented Jan. 29, 1963

3,076,005
NICKEL THIOCYANATE COMPLEXES OF THE WERNER TYPE
Pierre Marie Joseph Ghislain de Radzitzky d'Ostrowick and Jacques Daniel Victor Hanotier, Brussels, Belgium, assignors to Labofina S.A., Brussels, Belgium
No Drawing. Filed Mar. 1, 1962, Ser. No. 176,764
Claims priority, application Great Britain Mar. 6, 1961
18 Claims. (Cl. 260—439)

This invention relates to compositions of the "Werner complex" type and has for its object the provision of new chemical compositions of the "Werner complex" type which are sparingly soluble or insoluble in water at room temperature.

Another aspect of this invention is the use of such compounds as clathrating agents and separation of selectively absorbed compounds by clathration.

Such compositions where the aminated base is an arylalkylamine the aryl group of which is a substituted or unsubstituted phenyl group have been described in our U.S. applications Ser. No. 122,649, filed July 10, 1961, and Ser. No. 855,957 filed November 30, 1959.

The object of this invention is to provide additional novel compounds which can also be utilized as clathrating agents. Other objects and advantages of this invention will become apparent upon further study of the specification and appended claims.

It has now been found that new complexes of the Werner type are obtained from nickel thiocyanate and an aminated base of the alpha-arylalkylamine type the aryl group of which is a bicyclic radical comprising a benzene nucleus to one or two carbon atoms of which there is directly attached a further cyclic group which may also be benzenic. According to the present invention therefore, there is provided a compound of the general formula $Ni(SCN)_2X_n$, which is insoluble or sparingly soluble in water at room temperature wherein X is an alpha arylalkylamine having the general formula

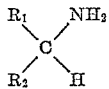

where $R_1$ is either hydrogen or a primary alkyl group and $R_2$ is a bicyclic radical the rings of which have each 6 carbon atoms and are directly linked to each other, the nucleus linked to the central carbon atom C being a benzenic nucleus. $n$ is an even number between 1 and 5.

The number of carbon atoms of the alkyl group may vary within rather broad limits. Nevertheless a probability of getting steric effect impeding the formation of the complex will be met with the higher alkyl groups. Also, the solubility and the physical aspect of the complexes depend on the length of the chain $R_1$. The solubility in hydrocarbons will increase with the length of the chain and the complex will get more and more waxy as the chain increases. It is thus preferred that there be 1 to about 9 carbon atoms in the alkyl group, even more preferably 1–5 carbon atoms.

It is to be noted that no choice is made regarding the form of the anion SCN. The formula SCN must be taken as a whole and not be restricted specifically to any of the normal or iso forms.

Conveniently the cyclic group attached to the benzenic nucleus is a 6 carbon atom ring and may be saturated or not. When the 2 rings are not condensed the substitution will preferably be in the para position; if condensed, the second ring will preferably be linked by meta and para carbon atoms.

The complexes have numerous uses; they can be dissolved in organic polar solvents, thus permitting the introduction of metals into these solutions, in which they can act as oxidation or polymerization catalysts (drying oils). They can also be used in solution for impregnating catalytic masses. In solid form, they can be used in heterogeneous catalysis or as clathrating agents.

As clathrating agents they permit resolution of mixtures which are difficult to resolve by conventional methods, particularly mixtures of aromatic isomers. As shown by the specific examples given hereafter, the complexes exhibit high selectivities and extremely high capacities as clathrating agents towards bicyclic aromatic molecules. They form therefore a convenient means for resolution of mixtures of bicyclic aromatic isomers, such as methylnaphthalenes. When compared to complexes of the same general formula, but using other types of arylalkylamines, the complexes of this invention exhibit a marked and highly unexpected superiority in such separation processes.

The preparation of the complexes according to the invention will now be described with reference to the following non-limitative preferred embodiments.

Specific preferred examples of the hereinbefore described class of aminated base are:

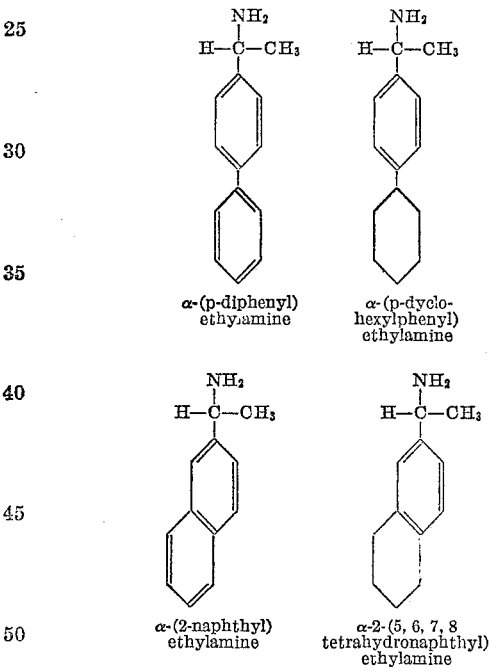

α-(p-diphenyl) ethylamine    α-(p-dyclohexylphenyl) ethylamine

α-(2-naphthyl) ethylamine    α-2-(5, 6, 7, 8 tetrahydronaphthyl) ethylamine

All amines described above have little or no ammoniacal odor, thus differing markedly from heterocyclic nitrogen bases, which exhibit strong and persistent nauseous odors. In addition, all the amines employed in this invention have a very low vapor pressure, thus reducing fire risks.

The complexes thus defined are insoluble in water and in aliphatic hydrocarbons at ordinary temperature. By "insoluble," a maximum of about 0.5 grams of complex can be dissolved in 100 gms. of solvent at room temperature. When $n$ is 4, the complexes are generally soluble in organic polar solvents. Their solubility in aromatic hydrocarbons increases as a function of the number of carbon atoms of the said primary alkyl group.

EXAMPLE 1

For preparing the complex $[Ni(SCN)_2[\alpha-(2-naphthyl) ethylamine]_4]$ a solution of 0.0250 mole of α-(2-naphthyl) ethylamine in 15 ml. of decalin is slowly added, while stirring at room temperature, to an aqueous solution obtained by dissolving 0.0056 mole of $NiCl_2.6H_2O$ and 0.0114 mole of KSCN in 6 ml. of distilled water. After stirring for 30 minutes, the resulting precipitate is then separated by filtration, washed twice with 20 ml. of heptane and once with 20 ml. of pentane, and dried for 2 hours under vacuum. The composition of the resulting 4-base complex is shown in Table I.

The other complexes in accordance with the invention are prepared in a similar manner.

The 2-base complexes are obtained by using stoichiometric quantities of reactants, i.e. 2 × moles of amine, × moles $NiCl_2 \cdot 6H_2O$, 2 × moles of KCNS, a slight deficit of amine being advisable.

For complexes conforming to the general formula $Ni(SCN)_2X_n$ (X=aminated base) the theoretical values of the molar ratios SCN/Ni and X/Ni are respectively 2 and 4 when $n=4$, and 2 when $n=2$.

For the complexes herein described, we have found, by functional analysis, ratios very close to the theoretical valuses, leaving no doubt about the composition of the complexes.

The solubility of the new complexes in methanol has been determined. This solubility may be increased by adding some of the corresponding amine. All the complexes are very slightly soluble in a commercial mixture of xylenes.

*Table I*

| | Color | Molar ratios | | Solubility in methanol |
|---|---|---|---|---|
| | | X/Ni | SCN/Ni | |
| $Ni(SCN)_2[\alpha$-(2-naphtyl)-ethylamine$]_4$ | Pale blue | 4.07 | 2.04 | Slightly soluble. |
| $Ni(SCN)_2[\alpha$-[2-(5,6,7,8 tetrahydronaphthyl)] ethylamine$]_4$ | do | 4.08 | 1.97 | Soluble. |
| $Ni(SCN)_2[\alpha$-(p-diphenyl) ethylamine$]_4$ | do | 4.17 | 2.00 | Slightly soluble. |
| $Ni(SCN)_2[\alpha$-(p-cyclohexyl-phenyl)ethylamine$]_4$ | do | 4.03 | 2.05 | Soluble. |
| $Ni(SCN)_2(\alpha$-p-biphenyl-ethylamine$)_2$ | Pale green | 1.88 | 2.08 | Very slightly soluble. |

Crude mixtures of monomethylnaphthalenes are obtained by distillation of coal tar or from an aromatic petroleum fraction. Mixtures of monomethylnaphthalenes are used for instance as reference fuel in the A.S.T.M. method. For some other uses, such as further synthesis, however, one may require one of the two isomers in the pure form. The β-isomer, when present in high concentration, may be obtained in a pure form by freezing it out of the mixture. The α-isomer is more difficult to isolate in a pure form. Clathration of such mixtures by complexes according to the present invention leads to the separation of each isomer.

The use of the new compounds as clathrating agents will be described with reference to the following example.

EXAMPLE 2

For clathrating an acid-washed commercial mixture of monomethylnaphthalenes by $[Ni(SCN)_2[\alpha$-(2-naphthyl) ethylamine$]_4]$ a solution of 0.0250 mole of α-(2-naphthyl)ethylamine in 15 ml. of the mixture of methylnaphthalenes (in moles percent: α 55; β 45) is slowly added, while stirring at the ice bath temperature, to an aqueous solution obtained by dissolving 0.0056 mole of $NiCl_2 \cdot 6H_2O$ and 0.0114 mole of KSCN in 6 ml. of distilled water. After stirring for 30 minutes, the resulting precipitate is then separated by filtration, washed twice with 20 ml. of heptane and once with 20 ml. of pentane, and then dried in air.

3 g. of the dry precipitate are decomposed by 15 ml. of 6NHCl; the supernatant organic phase is extracted by 5 ml. of p-cymene and analyzed by vapor phase chromatography. It is found that 32α of the solid obtained consists of methylnaphthalene isomers with a strong enrichment of the α-isomer (in moles percent: α 70; β 30).

The remainder consists essentially of the complex $[Ni(SCN)_2($amine$)_4]$.

Other resolutions of mixtures of aromatic compounds are realized by the same procedure employing the same complex or the other complexes according to the invention; the results of such clathrations are summarized in Table II.

*Table II*

| Aminated base of the 4-base complex | Composition of the feed (weight percent) | Composition of the clathrated mixture (weight percent) | Clathrated compound in the clathrate (weight percent) |
|---|---|---|---|
| α-(2-naphtyl)-ethylamine. | Methylnaphthalenes: α=55 β=45 | 70 30 | 31.8 |
| Do | o-xylene, 42 α-methylnaphthalene, 58. | 8 92 | 16.6 |
| α-(p-cyclohexylphenyl)-ethylamine. | Methylnaphthalenes: α=55 β=45 | 70 30 | 29.3 |
| α-(p-diphenyl)-ethylamine. | Methylnaphthalenes: α=55 β=45 | 62 38 | 23.7 |
| α-2(5,6,7,8-tetrahydronaphthyl)ethylamine. | o-xylene, 42 α-methylnaphthalene, 58. | 18 82 | 3.6 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. A Werner complex having the formula

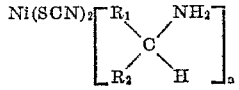

wherein n is an even number between 1 and 5,
$R_1$ is selected from the group consisting of hydrogen and a primary alkyl radical of 1 to 9 carbon atoms,
$R_2$ is a bicyclic radical having unsubstituted rings of six carbon atoms each, which rings are directly linked to each other, the ring attached to the central carbon atom bearing the amino group being aromatic.

2. A Werner complex having the formula

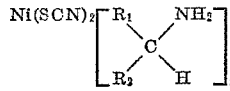

wherein n is an even number between 1 and 5,
$R_1$ is selected from the group consisting of hydrogen and a primary alkyl radical of 1 to 9 carbon atoms,
$R_2$ is a bicyclic radical having unsubstituted rings of 6 carbon atoms each and which rings are condensed, the ring attached to the central carbon atom bearing the amino group always being aromatic.

3. A Werner complex having the formula

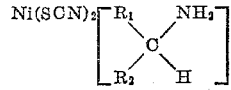

wherein n is an even number between 1 and 5,
$R_1$ is selected from the group consisting of hydrogen and a primary alkyl radical of 1 to 9 carbon atoms,
$R_2$ is a bicyclic radical the rings of which are unsubstituted and non-condensed and directly linked together and have each 6 carbon atoms, the ring attached to the central carbon atom bearing the amino group always being aromatic.

4. A Werner complex having the general formula

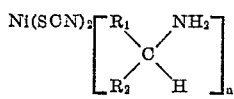

wherein $n$ is an even number between 1 and 5,
$R_1$ is selected from the group consisting of hydrogen and primary alkyl radicals having 1 to 9 carbon atoms,
$R_2$ is a bicyclic radical having unsubstituted rings which are condensed and have each 6 carbon atoms, the ring attached to the central carbon atom bearing the amino group being unsaturated and the other one being linked by the carbon atoms in meta and para position with respect to the carbon bearing the amino group.

5. A Werner complex having the formula

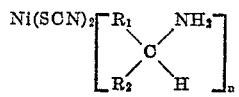

wherein $n$ is an even number between 1 and 5,
$R_1$ is selected from the group consisting of hydrogen and a primary alkyl radical of 1 to 9 carbon atoms,
$R_2$ is a bicyclic radical having unsubstituted rings of 6 carbon atoms each, the ring attached to the central carbon atom bearing the amino group being aromatic and the other one being in para position with respect to said carbon atom.

6. The complex described in claim 1, wherein n=2 and $R_2$ is a paracyclohexylphenyl radical.

7. The complex described in claim 1, wherein n=2 and $R_2$ is an alpha-(2-naphthyl)radical.

8. The complex described in claim 1, wherein n=2 and $R_2$ is an alpha-[2-(5,6,7,8-tetrahydronaphthyl)] radical.

9. The complex described in claim 1, wherein n=4 and $R_2$ is a paradiphenyl radical.

10. The complex described in claim 1, wherein n=4 and $R_2$ is a paracyclohexylphenyl radical.

11. The complex described in claim 1, wherein n=4 and $R_2$ is an alpha-(2-naphthyl) radical.

12. The complex described in claim 1, wherein n=4 and $R_2$ is an alpha-[2-(5,6,7,8-tetrahydronaphthyl)] radical.

13. The complex described in claim 1, wherein n=2 and $R_2$ is a paradiphenyl radical.

14. A Werner complex having the formula

wherein $n$ is an even number between 1 and 5, X is an alpha-arylalkylamine selected from the group consisting of—

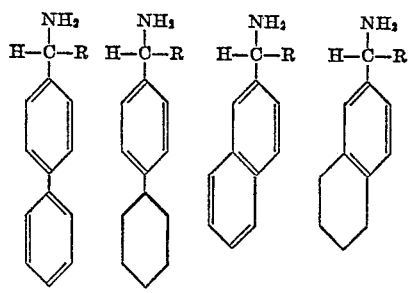

wherein R is selected from the group consisting of hydrogen and a primary alkyl group of 1-5 carbon atoms.

15. A Werner complex having the formula

wherein $n$ is an even number between 1 and 5, X is an alpha-arylalkylamine having the following formula—

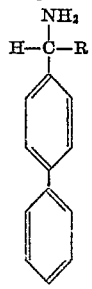

wherein R is selected from the group consisting of hydrogen and a primary alkyl group of 1-5 carbon atoms.

16. A Werner complex having the general formula

wherein $n$ is an even number between 1 and 5, X is an alpha-arylalkylamine having the following formula—

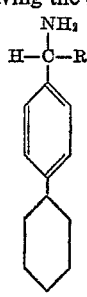

wherein R is selected from the group consisting of hydrogen and a primary alkyl group of 1-5 carbon atoms.

17. A Werner complex having the formula

wherein $n$ is an even number between 1 and 5, X is an alpha-arylalkylamine having the following formula—

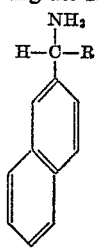

wherein R is selected from the group consisting of hydrogen and a primary alkyl group of 1-5 carbon atoms.

18. A Werner complex having the formula

wherein $n$ is an even number between 1 and 5, X is an alpha-arylalkylamine having the following formula—

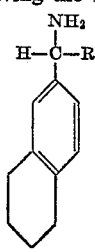

wherein R is selected from the group consisting of hydrogen and a primary alkyl group of 1-5 carbon atoms.

References Cited in the file of this patent

UNITED STATES PATENTS

| | | |
|---|---|---|
| 2,955,144 | Sisco et al. | Oct. 4, 1960 |
| 2,968,665 | Mahler | Jan. 17, 1961 |
| 2,993,065 | Kumins et al. | July 18, 1961 |
| 3,005,032 | Makin | Oct. 17, 1961 |